L. A. RAGAN.
COMBINED AUTOMOBILE TAIL LIGHT AND STATE LICENSE PLATE HOLDER.
APPLICATION FILED OCT. 8, 1921.

1,415,116.

Patented May 9, 1922.

WITNESS:
Veldie Doering

Louis Arthur Ragan INVENTOR

UNITED STATES PATENT OFFICE.

LOUIS ARTHUR RAGAN, OF ST. LOUIS, MISSOURI.

COMBINED AUTOMOBILE TAIL LIGHT AND STATE-LICENSE-PLATE HOLDER.

1,415,116.

Specification of Letters Patent. Patented May 9, 1922.

Application filed October 8, 1921. Serial No. 506,517.

*To all whom it may concern:*

Be it known that I, LOUIS ARTHUR RAGAN, a citizen of the United States, residing in the city of St. Louis, State of Missouri, have invented a new and useful Combined Automobile Tail Light and State-License-Plate Holder, of which the following is a specification.

My invention has relation to improvements in combined automobile tail-lights and license plate holders, and consists in the novel features of construction more fully set forth in the specification and pointed out in the claim.

The object of the present invention is to combine in one housing an automobile tail-light and holder for the license plate, said plate being illuminated by the lamp which furnishes the tail-light, the ray from said lamp being reflected onto the face of the plate. Owing to the fact that most of the States have a standard metal license plate, the reflection must be so disposed as to throw the light on the face of the plate mounted in the housing, said plate being visible through a glass panel. The manner of accomplishing these objects, together with other objects, will be better apparent from a detailed description of the invention in connection with the accompanying drawings, in which—

Figure 3:
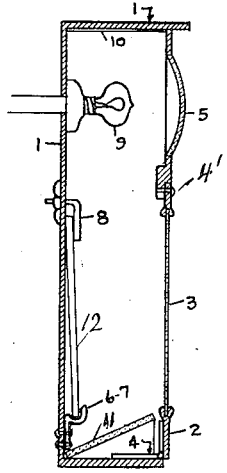
Figure 2:
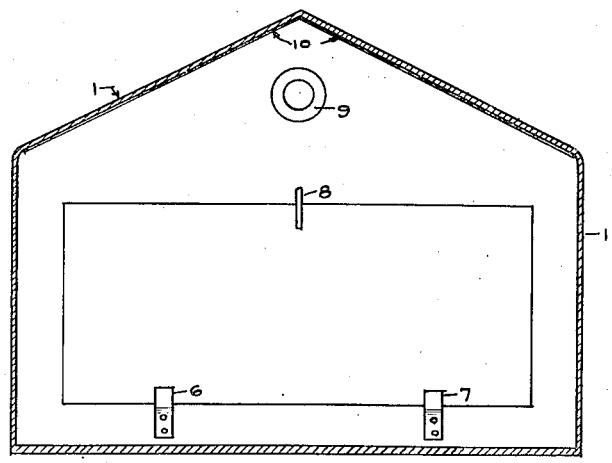
Figure 1:
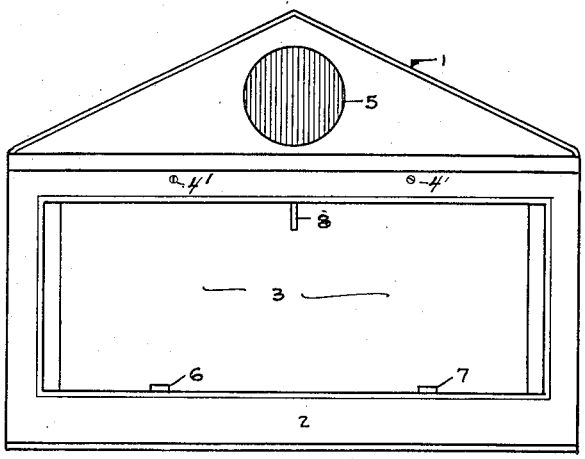

Figure 1 is a face view of my improved holder; Fig. 2 is a sectional view showing the inside of the rear wall on which the license plate is mounted; Fig. 3 is a vertical middle cross-section through the holder.

Referring to the drawings, 1 represents the housing having a door 2 hinged to the bottom along its forward edge by means of hinges 4. In the present instance I show a pair of screws 4', 4' passing through the door near its upper edge and threaded into the front wall of the housing 1 into which is fitted a red lens 5 for the tail-light. A glass panel 3 is set into the door 2, said panel being of clear transparent glass so that the license plate 12 may be visible through the panel 3, said plate being supported against the rear wall of the housing 1 in a pair of brackets 6, 7 and held in place by a latch 8 which is adapted to be turned over the upper edge of the license plate. A lamp 9 is mounted within the housing 1 and directly behind the lens 5 so that when the lamp is lit the lens 5 will transfuse a red light.

It will be observed that the top of the housing comprises two downwardly inclining walls coming together in a ridge at the center, and a reflector 10 is secured on the inside of each of these inclined top walls. In lieu of separate reflectors 10, 10 the inside of these walls themselves may be provided with a reflecting surface. A second reflector 11 is positioned within the housing beneath the license plate, and is inclined to reflect against said plate the light rays that are thrown on it. In fact, the inclination of the reflecting surfaces 10, 10 is such as to reflect practically all the light that reaches them downwardly onto the reflector 11, which in turn reflects this light onto the license plate. From the foregoing it will be apparent that there is practically no absorption of light before it reaches the license plate, as the reflectors are so arranged that a maximum of light rays will reach said plate.

The housing 1 may be mounted at the rear of the automobile in any well known manner, and the license plate being housed within it will be kept comparatively clean, so that by virtue of the concentration of light upon it, said plate may be clearly seen at a considerable distance.

Having described my invention, I claim:

A license plate holder comprising a housing, means within said housing for supporting a license plate, a source of light within the housing, reflectors adjacent to said source of light, a reflector opposed to said first-mentioned reflectors beyond and adjacent to the license plate, said first-mentioned reflectors being disposed to reflect the light rays onto the last-mentioned reflector, and said last-mentioned reflector being disposed to reflect said light rays against the face of the license plate.

LOUIS ARTHUR RAGAN.